(12) United States Patent
Updegrove et al.

(10) Patent No.: US 7,753,319 B1
(45) Date of Patent: Jul. 13, 2010

(54) ADJUSTABLE CABLE HANGER FOR SECURING CABLES EXTERNALLY

(75) Inventors: Darryl Updegrove, Panama City, FL (US); Brian Stout, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 359 days.

(21) Appl. No.: 12/001,594

(22) Filed: Dec. 10, 2007

(51) Int. Cl.
*F16L 3/08* (2006.01)

(52) U.S. Cl. .................. 248/67.7; 248/68.1; 248/73; 248/558

(58) Field of Classification Search ............... 248/49, 248/58, 65, 67.7, 68.1, 73, 558
See application file for complete search history.

(56) References Cited

U.S. PATENT DOCUMENTS

| | | | | |
|---|---|---|---|---|
| 4,258,949 A | * | 3/1981 | Keagbine | 294/81.21 |
| 5,004,071 A | * | 4/1991 | Mallard et al. | 182/3 |
| 5,769,365 A | * | 6/1998 | Onishi et al. | 248/49 |
| 5,921,402 A | * | 7/1999 | Magenheimer | 211/26 |
| 6,422,795 B2 | * | 7/2002 | Holt et al. | 410/115 |
| 6,666,635 B2 | * | 12/2003 | Holt et al. | 410/115 |
| 6,877,939 B2 | * | 4/2005 | Tomkins et al. | 410/46 |

* cited by examiner

*Primary Examiner*—J. Allen Shriver, II
*Assistant Examiner*—Bradley H Duckworth
(74) *Attorney, Agent, or Firm*—James T. Shepherd

(57) ABSTRACT

An apparatus and method suspends cables from the top and sides of a shipping and stowage container having separated block-shaped fittings with top and side openings. A cross bar with rounded support structure suspends the cables and extends past the block-shaped fittings. First twist-lock fittings are mounted on a first side of the cross bar in the same spaced-apart relationship as the openings on the sides of the separated block-shaped fittings. Bayonets in the twist-lock fittings can be inserted into the side and top openings and rotated to secure the apparatus to the block-shaped fittings. Rotatable end hangers support cables beyond the container. Second twist-lock fittings are mounted on a second side of the cross bar in the same spaced-apart relationship as the openings on the tops of the separated block-shaped fittings.

6 Claims, 3 Drawing Sheets

ADJUSTABLE CABLE HANGER FOR SECURING CABLES EXTERNALLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to cable hangers for suspending flexible cables from shipping and stowage containers. More particularly, this invention is for a cable hanger readily coupled to preformed mounting blocks on shipping and stowage containers for suspending cables above a deck or walkway to reduce possible hazards and maintain reliable electrical, hydraulic and/or optical interconnections.

Containers for shipping goods are widely used in air, sea and land transport vehicles for a multitude of different items. Large containers can efficiently keep many items together as a lot and provide a degree of protection during the haul. The containers can rest singly or be stacked on the deck or pallets and usually are arranged in holds and on the decks in accessible rows and columns having walkways for ventilation and for workmen. Large transport vehicles can carry many of the containers that can extend across considerable area in large holds or other spacious deck areas.

Most of the long-haul shipping and stowage containers used by the great majority of commercial air and maritime commerce have evolved into a standard design. The standard established by ISO 1161 requirements by the International Organization for Standardization is for containers of standardized dimensions and ruggedness to promote efficiency and safety for air and maritime use. The ISO 1161 containers are robustly constructed with rigid side walls mounted on strong frameworks that have a heavy-duty block-shaped corner fitting at each of the containers' eight corners. The corner fittings as well as the other parts of an ISO 1161 container can be made from steel, aluminum or other tough material.

The block-shaped corner fittings have elongated openings sized to receive appropriately dimensioned heavy-duty rotatable bayonet portions of twist-lock fittings. When a bayonet portion in inserted through an opening and into a corner fitting, the inserted portion is manually rotated a partial turn via its attached small twist-lock lever. This rotation of the inserted bayonet portion securely engages the twist-lock fitting to the block-shaped corner fitting, and whatever is coupled to the other end of the twist-lock fitting is thereby secured to the container. Individual containers can be securely stacked together by double ended twist-lock fittings engaging abutting block-shaped corner fittings, or hoisting slings or other components can be secured to the containers via similar twist-lock fittings. A considerable number of ISO 1161 corner fittings and interfacing twist-lock fittings are commercially available by a number of well known suppliers such as TANDUMLOC Inc., 824 Highway 101, Havelock, N.C. 28532, for example.

It is not uncommon to have a number of electrical, hydraulic and/or optical cables reaching across the storage areas of the containers. These cables provide for the numerous power and communication needs of the host vessel, and in addition some of the cables might be used to supply electrical power or communications links with equipments in some of the containers during transit. Because of the tight time schedules of most on-loading operations, the cables have been loosely draped across the tops of the containers and passageways between them. These cables have been known to hang down into the walkways and obstruct or trip the crewmen and other workmen. The hanging or underfoot cables also could become damaged and create severe fire hazards with possible injuries and fatalities along with the interruption of their normal functions.

Thus, in accordance with this inventive concept, a need has been recognized in the state of the art for a cable hanger for securely suspending cables externally to shipping containers to reduce the possibility of injury of personnel and interruption of electrical, hydraulic, and/or communications functions.

SUMMARY OF THE INVENTION

The present invention provides an apparatus and method for suspending cables from a shipping and stowage container. The container has standardized separated block-shaped fittings that are each provided with openings on the tops and sides. An elongate cross bar has a length to extend past the spaced-apart fittings of the container and a rounded cable support structure is mounted on the elongate cross bar to support and suspend the cables from the container. A first pair of twist-lock fittings is mounted on a first side of the elongate cross bar and the pair is in a spaced-apart relationship of essentially the same distance as between the top openings or side openings of the separated block-shaped fittings. Each of the first pair of twist-lock fittings has an outwardly extending rotatable bayonet portion connected to a handle. The spaced-apart relationship of the first pair of twist-lock fittings permits the rotatable bayonet portions extending outwardly on each of the first pair of twist-lock fittings to be inserted through the side or top openings on the separated block-shaped fittings, and permits rotation of each rotatable bayonet portion by its interconnected handle to securely engage each corner block fitting. A second pair of twist-lock fittings is mounted on a second side of the elongate cross bar. The second pair of twist-lock fittings is in a spaced-apart relationship of essentially the same distance as between the top openings or side openings of the separated block-shaped fittings. The twist-lock fittings of the second pair each have an outwardly extending rotatable bayonet portion connected to a handle. The spaced-apart relationship permits insertion of the bayonet portions of the second twist-lock fittings through the top or side openings on the separated block-shaped fittings and permits rotation of each rotatable bayonet portion by its interconnected handle to securely engage each block-shaped fitting.

A pair of elongate end hangers that are shaped for slideably fitting within opposite ends of the cross bar each has a pin for engaging select holes in the cross bar to secure each elongate end hanger at a desired degree of longitudinal extension from the cross bar. A laterally extending guide portion at the end of each elongate end hanger has vertical keepers at opposite ends. Each laterally extending guide portion provides vertical support for cables and each vertical keeper retains cables on each laterally extending guide portion. Optionally, the end hangers can be withdrawn from the cross bar, rotated a quarter turn and reinserted and secured in the cross bar to allow top or side suspension of cables from the container.

An object of the invention is to provide a device for suspending at least one cable above a passageway.

Another object of the invention is to provide a device for suspending cables from a shipping container.

Another object of the invention is to provide a device for suspending cables above or to the side of a shipping container.

Another object of the invention is to provide a device that can be quickly and securely coupled to a shipping container to suspend one or more cables above a walkway and other areas around the container.

Another object of the invention is to provide a device readily connectable to the ends or sides of single or stacked shipping containers for suspending cables above peripheral areas.

Another object of the invention is to provide a device that can be quickly and securely coupled to a shipping container to suspend one or more cables to prevent their being trod upon or rolled over by equipment/machinery.

Another object of the invention is to provide a device that can be quickly secured to a shipping container with standard mobilization interfaces and interfacing hardware to suspend cables from the top or the side around the container.

Another object of the invention is to provide a device that can be quickly secured to a shipping container to suspend one or more cables at different degrees of extension from the top or the side around the container.

These and other objects of the invention will become more readily apparent from the ensuing specification when taken in conjunction with the appended claims.

DESCRIPTION OF THE PREFERRED EMBODIMENT

Figure 1:
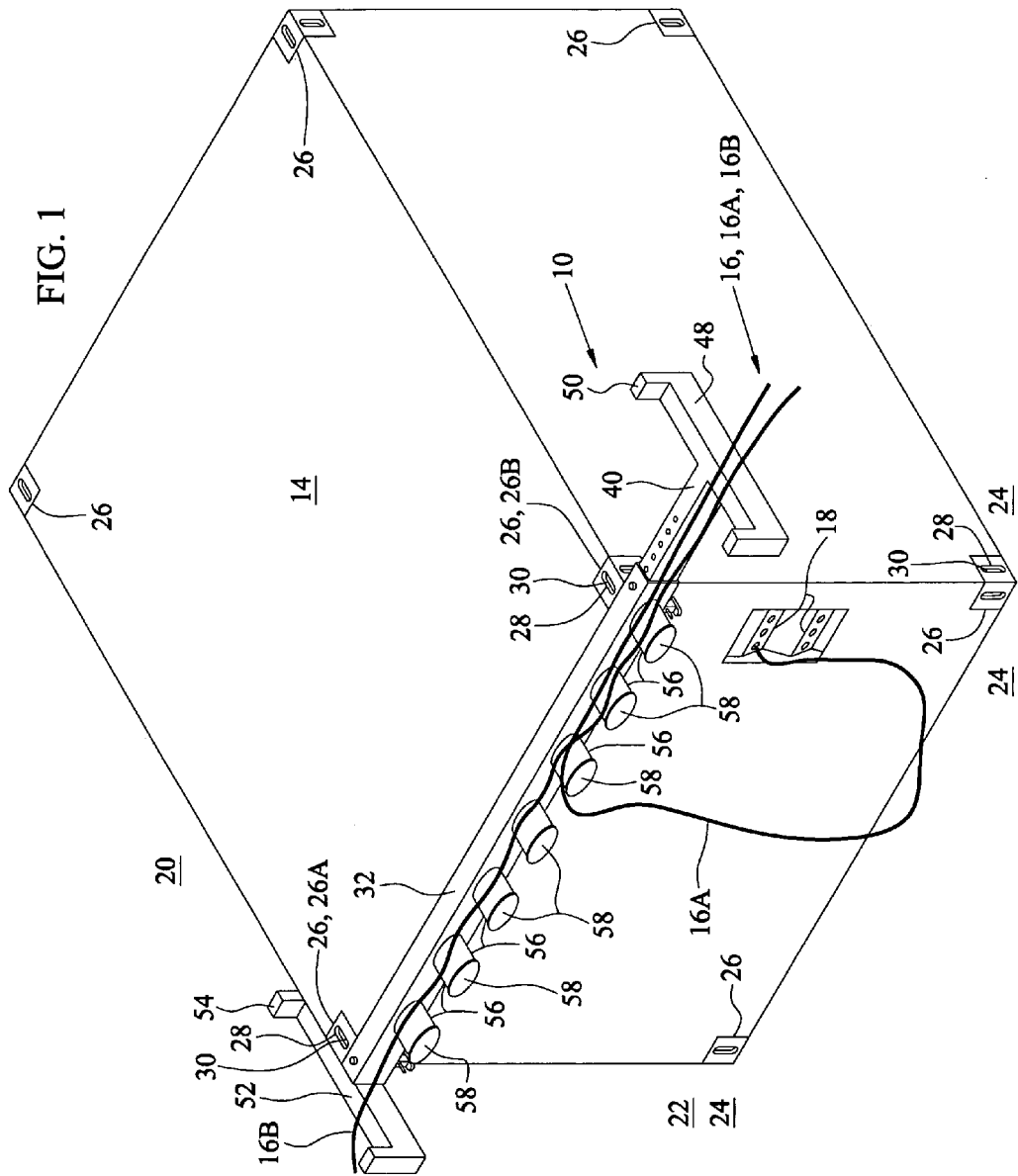
FIG. 1 is an isometric view of the cable hanger of the invention in the extended position for securing cables externally onto a shipping and stowage container.

Referring to FIG. 1, cable hanger 10 of the invention is shown mounted at the top of a shipping and stowage container 14. In accordance with the salient features cable hanger 10 assures a suspended support of one or more cables 16 that can be connected to equipment 18 inside container 14, a single one of which being depicted as cable 16A, and/or other cables, one of which being depicted as cable 16B, that extend from one side to the other of a storage area 20 where container 14 is located. Cables 16 are thereby suspended over deck/ground 22 where storage area 20 is located and above walkways 24 around each shipping and stowage container 14.

Shipping and stowage container 14 has a block-shaped corner fitting 26 at each of its eight corners. In accordance with ISO requirements, corner fittings 26 are fabricated from a tough material such as steel or aluminum having an elongated opening 28 machined in each of their exposed faces that communicates with a hollow interior 30. Such corner fittings are in widespread commercial use in the container industry to allow interconnection with external equipments and/or other containers. Examples of typical block shaped corner fittings are the weldable Models 243000C-BL, BR, TL, TR and 243000C-SBL, SBR, STL, STR marketed by Tandemloc Inc.

Figure 2:
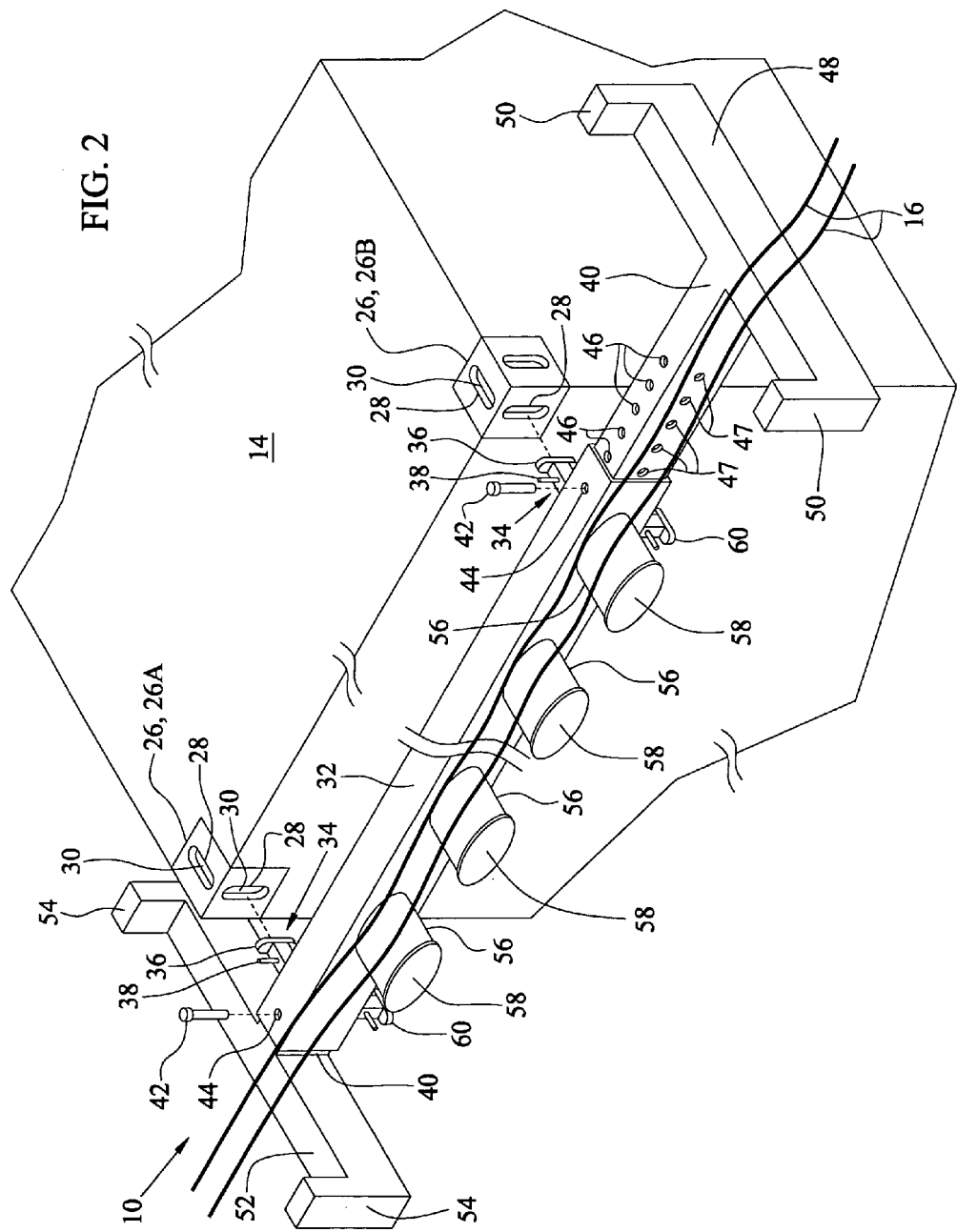
FIG. 2 is an isometric view of the cable hanger of the invention in a partially retracted position for securing cables externally in a side mounting configuration onto a shipping and stowage container.

Referring also to FIG. 2, cable hanger 10 of the invention is designed to quickly and securely engage the sides or tops of corner fittings 26A and 26B although it could also engage any side-by-side pair of block-shaped corner fittings 26 on container 14. Cable hanger 10 has an elongate cross bar 32 that can have a hollow square cross sectional configuration like that shown or could have other cross sectional shapes such as circular, elliptical, etc. Cross bar 32 is designed to meet the requirements of ISO 1161 so that it has sufficient length to be secured to the top or side openings 28 of corner fittings 26A and 26B or other corner fittings 26 with similar spatial separations on shipping and stowage container 14.

Cross bar 32 has a pair of heavy-duty twist-lock fittings 34 welded onto one of its sides at opposite end portions to allow cable hanger 10 to engage the outside ones of openings 28 on the sides of corner fittings 26A and 26B. Twist-lock fittings of the type used in association with this invention to engage appropriately shaped corner fittings are in widespread commercial use to engage stacked containers or secure other external equipments. Exemplary, typical twist-lock fittings that could be selected for mounting on cross bar 32 could be the Weldable Fastmount Model N2501BA-1PA, -2PA, -3PA, -PA, Model 806000T-100, or Model S38000B-IPA, also marketed by Tandemloc Inc. Each of these typical twist-lock fittings has a bayonet portion rotatable by a small handle to engage an apertured fixture such as the exemplary block shaped corner fittings, Models 243000C-BL, BR, TL, TR and 243000C-SBL, SBR, STL, STR marketed by Tandemloc Inc., as mentioned above.

The pair of twist-lock fittings 34 are spaced-apart essentially the same distance as are the same side facing openings 28 in corner fittings 26A and 26B. This spacing permits an appropriately dimensioned heavy-duty rotatable bayonet portion 36 extending outwardly on each twist-lack fitting 34 to be inserted through aligned outer ones of elongate openings 28 and into hollow interiors 30 of corner block fittings 26A and 26B. After each bayonet portion 36 has been inserted through an opening 28 and into interior 30, an operator rotates a small handle 38 extending from each twist-lock fitting 34 a part of a revolution. Since each handle 38 is connected to a separate rotatable bayonet portion 36 that has been inserted into an opening 28, each bayonet portion 36 is correspondingly rotated a like amount to securely engage each corner fitting 26 and secure cross bar 32 of cable hanger 10 to corner fitting 26.

Cross bar 32 has an elongate end hanger 40 at each end that has a square cross section or is otherwise suitably shaped for telescoping or slideably fitting within cross bar 32. Each end hanger 40 can be pulled out of or retracted into cross bar 32 and secured at a desired degree of longitudinal extension by a straight or tapered pin 42 inserted through a hole 44 in cross bar 32 and selected a one of holes 46 provided along at least part of the length in each end hanger 40. A laterally extending guide portion 48 at the end of end hanger 40 provides vertical support for supported cables 16. Vertical keepers 50 at opposite ends of guide portion 48 retain cables 16 on end hanger 40. Another laterally extending guide portion 52 is connected to another end hanger 40 that is configured like the other end hanger 40 but is not completely visible in the figures because it is in the fully retracted position and retained by an interlocking pin 42 inside of and at the opposite end of cross bar 32. Guide portion 52 on the retracted end hanger 40 provides additional vertical support and guidance for supported cables 16. Vertical keepers 54 at opposite ends of guide portion 52 also help retain cables 16 on cable hanger 10. If it is desired to hang cables 16 over the walkway 24 at the far side of container 14, the retracted end hanger 40 can be extended from cross bar 32 and secured in a desired length of extension from cross bar 32 by a pin 42 inserted through aligned holes in the now extended end hanger 40 and cross bar 32.

A series of rounded cable support structures 56 are included along the length of cross bar 32 to aid in the suspension of cables 16 by cable hanger 10. Cable support structures 56 each have an oblong rounded shape and a rounded continuous retaining lip 58 to retain cables 16 on cable hanger 10 and to avoid creating any irregular surface that might abrade or otherwise impede sliding motion of any of cables 16 that are placed to extend across them. The laterally extending guide portions 48 and 52 and vertical keepers 50 and 54 in cooperation with rounded cable support structures 56 and retaining lips 58 assure positive support and retention of cables to keep walkways and other trafficked areas free of potentially dangerous cables.

If cable hanger 10 is desired to be mounted on the top openings of block shaped fittings 26 on container 14, cross bar 32 with end hangers 40 in place can be rotated ninety degrees to align and engage twist-lock fittings 34 with top openings 28 of block-shaped corner fittings 26A and 26B and/or other like-spaced block corner fittings 26. End hangers 40 at opposite ends of cross bar 32 can be withdrawn from cross bar 32, rotated ninety degrees in the opposite direction of rotation as cross bar 32 was rotated, and reinserted in cross bar 32. Next, pins 42 are reinserted through aligned ones of holes 47 extending through end hangers 40 and holes 44 at opposite ends of cross bar 32 to secure the rotated end hangers 40. This feature allows cable hanger 10 of the invention to have only one pair of twist-lock fittings 34 for selective engagement of side and top openings 28 of any pair of appropriately spaced-apart block-shaped corner fittings 26.

Figure 3:
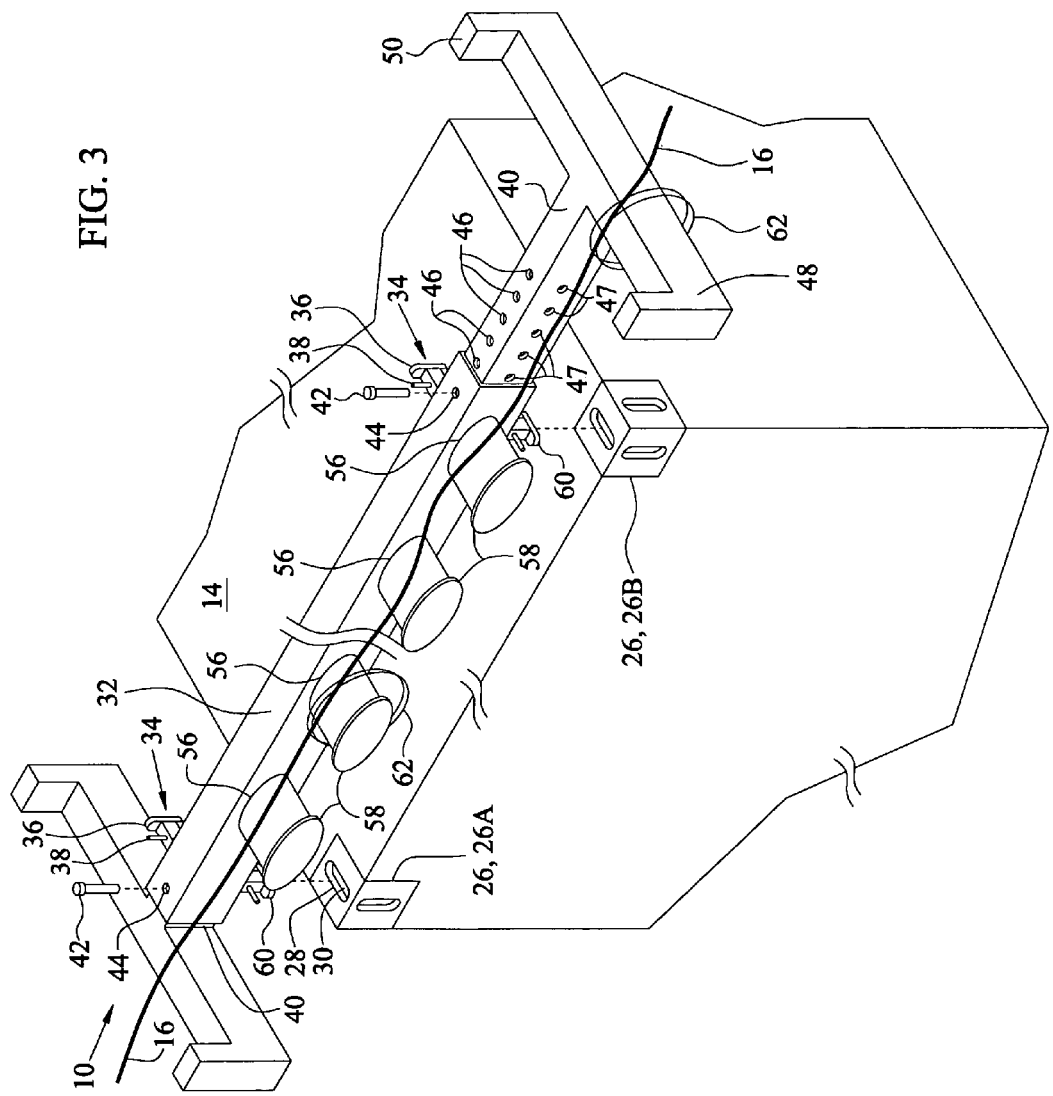
FIG. 3 is an isometric view of the cable hanger of the invention in a partially retracted position for securing cables externally in a top mounting configuration onto a shipping and stowage container.

Referring also to FIG. 3, cable hanger 10 of the invention is shown in a partially retracted position for securing cables 16 externally in a top mounting configuration onto a shipping and stowage container 14. Cable hanger 10 can be preferably made to have two twist-lock fittings 60 of the same design as described above welded or otherwise mounted on a different side than twist-lock fittings 34, in this case the bottom side of cross member 32. This configuration of cable hanger allows a workman to quickly and securely engage the tops of block-shaped corner fittings 26A and 26B to support cables 16 above container 14 without any modification. In other words, cable hanger 10 of the invention has pairs of both twist-lock fittings 34 and 60 to allow workmen to utilize a single standardized unmodified design for cable hanger 10 for suspending cables 16 at the side or over the top of container 14. Heavy-duty twist-lock fittings 60 welded onto the bottom of the opposite end portions of cross member 32 allow cable hanger 10 to engage the outside ones of openings 28 on the tops of corner fittings 26A and 26B. These twist-lock fittings 60 are also of the type described above that are in widespread commercial use.

The pair of twist-lock fittings 60 are also spaced-apart essentially the same distance as are the same top facing openings 28 in corner fittings 26A and 26B. This spacing permits quick secure engagement as described above with respect to engagement by twist-lock fittings 34.

Because of the prearranged spacing of twist-lock fittings 34 and 60 on cross bar 32, cross bar 32 can be secured to either the side or top of shipping and stowage container 14 to keep cable support structures 56 and guide portions 48 and 52 of cable hanger 10 substantially horizontal. Each support structure 56 of cable hanger 10 is rounded to prevent over-bending of the cable radius of supported cables 16, and has a lip 58 to retain cables 16 on cable hanger 10. A retaining cord, small line 62, or other suitable means can be used to secure cables 16 to cable hanger 10, as shown in FIG. 3. Because cross bar 32 can be attached to either the end or the top of shipping and stowage container 14, it is possible to use cable hanger 10 of the invention in areas where shipping and stowage containers are stacked or have a low overhead, or in areas where the shipping and stowage containers are placed against each other or there is little space around the sides of the shipping and stowage containers.

End hangers 40 can be inserted into cross bar 32 which has appropriate cross-sectional shapes that ensure that end hangers 40 cannot rotate relative to cross bar 32. End hangers 40 are designed to support cables 16 beyond the corners of shipping and stowage container 14, so that cables 16 can be suspended in air over a clear space around shipping and stowage container 14. End hangers 40 are secured in position to cross bar 32 using a securing pin 42 or other position securing feature to set the overall length of cable hanger 10 of the invention. End hangers 40 and guide portions 48 and 52 are designed to support the weight of cables 16, keep them from falling off on either side via vertical keepers 50 and 54, and provide another location where cables 16 can be secured to cable hanger 10 of the invention using retaining cord, small line 62 or other means. End hangers 40 can be removed when they are not required to be used; such as when it is not necessary to suspend ends of cables 16 away from shipping and stowage container 14.

Modifications and alternate embodiments of cable hanger 10 of the invention may be adapted, and differently configured to accommodate cables of different constituencies for many different operational conditions. All components of cable hanger 10 can be made from a wide variety of tough non-corrosive or corrosion resistant materials that will hold up in the harsh marine environment. In addition to the uncomplicated, highly functional cable hanger described, cable hanger 10 of the invention could have different shapes, sizes and materials to create other user-friendly shapes that can bear up under more adverse conditions.

The disclosed components, and their arrangements as disclosed herein, all contribute to the novel features of this invention. It should be readily understood that many modifications and variations of the present invention are possible within the purview of the claimed invention. It is to be understood that within the scope of the appended claims the invention may be practiced otherwise than as specifically described.

We claim:

1. An apparatus for suspending cables from a shipping and stowage container having separated block-shaped fittings each provided with openings on the tops and sides comprising:

an elongate cross bar having a length to extend past the spaced-apart block-shaped fittings of the container;

at least one rounded cable support structure mounted on said elongate cross bar to aid in the suspension of the cables from the container;

a first pair of twist-lock fittings mounted on a first side of said elongate cross bar, said first pair of twist-lock fittings being in a spaced-apart relationship of essentially the same distance as the openings on the sides of the separated block-shaped fittings; and a pair of elongate end hangers each provided with first holes disposed in a first side thereof, each said end hanger being shaped for slideably fitting within opposite ends of said cross bar;

said cross bar having a hole at each of its opposite ends, each of said holes in said cross bar being provided with a pin for engaging one of said first holes in each of said end hangers to secure each end hanger at a desired degree of longitudinal extension from said cross bar;

wherein each of said first pair of twist-lock fittings has an outwardly extending rotatable bayonet portion having a handle; and wherein said first pair of twist-lock fittings in said spaced-apart relationship are separated a distance to assure insertion of said rotatable bayonet portions through the openings on the sides of the separated block-shaped fittings so that rotation of each said rotatable bayonet portion engages said first pair of twist lock fittings to the block-shaped fittings.

2. The apparatus of claim 1 further comprising:
a laterally extending guide portion at the end of each said end hanger, said guide portions having vertical keepers at opposite ends thereof.

3. The apparatus of claim 2 wherein each said end hanger further includes second holes disposed in a second side thereof for receiving said pin so that said end hangers can be withdrawn from said cross bar, rotated ninety degrees, and reinserted and secured in said cross bar, thereby allowing said first pair of twist-lock fittings to engage the top openings of said block-shaped fittings while maintaining said end hangers in a horizontal position.

4. The apparatus of claim 1 further including:
a second pair of twist-lock fittings mounted on a second side of said elongate cross bar, said second pair of twist-lock fittings being in a spaced-apart relationship of essentially the same distance as the openings on the tops of the separated block-shaped fittings, said second pair of twist-lock fittings each having an outwardly extending rotatable bayonet portion having a handle.

5. The apparatus of claim 4 wherein said second pair of twist-lock fittings in said spaced-apart relationship are separated a distance to assure insertion of their said rotatable bayonet portions through the openings on the tops of the separated block-shaped fittings so that rotation of each rotatable bayonet portion in said second pair of twist-lock fittings securely engages said second pair of twist-lock fittings to the block shaped fittings.

6. The apparatus of claim 5 further comprising:
a laterally extending guide portion at the end of each said end hanger, said guide portions having vertical keepers at opposite ends thereof.

* * * * *